(12) United States Patent
Skelly

(10) Patent No.: US 11,094,128 B2
(45) Date of Patent: Aug. 17, 2021

(54) UTILIZING VIRTUAL REALITY AND HI-DEFINITION CAMERA TECHNOLOGY TO ALLOW PASSENGERS TO EXPERIENCE FLIGHT PATH

(71) Applicant: Panasonic Avionics Corporation, Lake Forest, CA (US)

(72) Inventor: Bryan Skelly, Pine Mountain Club, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 30 days.

(21) Appl. No.: 16/596,501

(22) Filed: Oct. 8, 2019

(65) Prior Publication Data
US 2021/0104099 A1    Apr. 8, 2021

(51) Int. Cl.
| | |
|---|---|
| *G06T 19/00* | (2011.01) |
| *G02B 27/01* | (2006.01) |
| *G06F 3/0481* | (2013.01) |
| *G06F 3/01* | (2006.01) |
| *G01C 21/36* | (2006.01) |

(52) U.S. Cl.
CPC ........ *G06T 19/006* (2013.01); *G01C 21/3635* (2013.01); *G02B 27/01* (2013.01); *G06F 3/011* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 10,559,135 B1 * | 2/2020 | Price | G06F 3/011 |
| 2009/0195652 A1 | 8/2009 | Gal | |
| 2010/0188506 A1 * | 7/2010 | Dwyer | H04N 7/18 348/144 |
| 2013/0169807 A1 * | 7/2013 | de Carvalho | H04N 7/183 348/144 |
| 2014/0085337 A1 * | 3/2014 | Velten | G06F 3/017 345/635 |
| 2014/0306874 A1 * | 10/2014 | Finocchio | G06F 3/011 345/156 |
| 2015/0077337 A1 * | 3/2015 | Coto-Lopez | G06F 3/017 345/156 |
| 2015/0233717 A1 | 8/2015 | Satti | |

(Continued)

*Primary Examiner* — Nurun N Flora
(74) *Attorney, Agent, or Firm* — Perkins Coie LLP

(57) ABSTRACT

Disclosed embodiments are directed at devices, methods, and systems for rendering a customizable 3D virtual environment of an outside world surrounding an airplane. The 3D virtual environment is rendered on a personal electronic device (e.g., a VR headset) and is composed from high-resolution image data received from a plurality of cameras mounted externally to the airplane. A seatback computer coupled to the personal electronic device receives data corresponding to the 3D virtual environment of the outside world from the airplane's compute server, which performs the tasks of analyzing the high-resolution image data to compose the 3D virtual environment. Further, the 3D virtual environment can be customized to a passenger's preferences based on gesture-based interactions of a passenger with the 3D virtual environment. The gesture-based interactions of a passenger are received by a sensor coupled to the personal electronic device.

18 Claims, 12 Drawing Sheets

(56) References Cited

U.S. PATENT DOCUMENTS

| | | | | |
|---|---|---|---|---|
| 2015/0362733 | A1* | 12/2015 | Spivack | G06F 3/016 |
| | | | | 345/633 |
| 2016/0090196 | A1* | 3/2016 | Besettes | B64D 25/08 |
| | | | | 244/129.5 |
| 2016/0325836 | A1* | 11/2016 | Teo | H04N 7/183 |
| 2017/0094167 | A1* | 3/2017 | Riedel | H04N 5/23238 |
| 2017/0098133 | A1* | 4/2017 | Brauer | G06K 9/00791 |
| 2017/0286037 | A1* | 10/2017 | Sizelove | H04W 12/0808 |
| 2018/0068170 | A1* | 3/2018 | Kohlmeier-Beckmann | |
| | | | | G09G 5/14 |
| 2018/0101225 | A1* | 4/2018 | Azmy | G06F 3/011 |
| 2019/0041658 | A1* | 2/2019 | Collier | G02B 27/1066 |
| 2019/0197748 | A1* | 6/2019 | Vandewall | B64D 11/0015 |

\* cited by examiner

UTILIZING VIRTUAL REALITY AND HI-DEFINITION CAMERA TECHNOLOGY TO ALLOW PASSENGERS TO EXPERIENCE FLIGHT PATH

TECHNICAL FIELD

This document is directed generally to enable the creation of interactive, real-time, 3D virtual views of the outside world from commercial airplanes for display to passengers and/or aircrew.

BACKGROUND

Commercial travel has evolved to provide entertainment options to passengers traveling to their destinations. For example, in an airplane or train, entertainment options are provided on monitors located on the back of seats, where the monitors can enable passengers to watch movies, television shows, play games, and/or or listen to music as they travel to their destinations. The monitors can also provide weather, time, and travel related information to the passengers. However, current implementations of customized entertainment systems do not have the level of interactivity that can enable passengers to have a more relaxed and positive air travel experience.

SUMMARY

This patent document describes exemplary systems, devices, and methods directed at creation of interactive, real-time, 3D virtual views of the outside world from commercial airplanes for display to passengers and/or aircrew. Based on high-resolution images captured by an array of cameras located outside the aircraft, a server located in the airplane can generate content using the high-resolution images for presentation on personal electronic devices (e.g., VR headsets) of passengers.

In one aspect, a method of rendering a customizable 3D virtual environment of an outside world surrounding an airplane comprises: receiving image data from a plurality of cameras mounted external to the airplane; analyzing in real time the high-resolution image data from the plurality of cameras to compose an interactive, 3D virtual environment using the high-resolution image data; and composing, in real-time, a 3D virtual environment from the image data; transmitting data corresponding to the 3D virtual environment to a seatback computer for rendering on a high-definition display screen of a virtual reality (VR) headset device of a passenger such that the 3D virtual environment is responsive to interactions of the passenger.

In another aspect, a method of rendering a customizable 3D virtual environment of an outside world surrounding an airplane comprises: pairing a virtual reality (VR) headset device with an associated seatback computer; receiving, at the VR headset device, data describing a 3D virtual environment composed from image data captured by a plurality of cameras mounted external to the airplane; and rendering the 3D virtual environment on a high-definition display screen of the VR headset device such that the 3D virtual environment is responsive to interaction inputs.

In yet another aspect, a method of rendering a customizable 3D virtual environment of an outside world surrounding an airplane comprises: receiving, at a seatback computer, data corresponding to at least a partly-processed 3D virtual environment describing the outside world surrounding the airplane; based on the data corresponding to at least the partly-processed 3D virtual environment, causing display of the 3D virtual environment on a VR headset device electronically coupled to the seatback computer; receiving, from the VR headset device, interaction data corresponding to one or more gestures of a passenger with the 3D virtual environment displayed on the VR headset device; and dynamically changing the 3D virtual environment displayed on the VR headset device in accordance with the interaction data.

In a further aspect, a system for rendering a customizable 3D virtual environment of an outside world surrounding an airplane comprises a headend computer having at least one processor configured to further one or more of the methods disclosed herein and a seatback computer having at least one processor configured to perform one or more of the methods disclosed herein.

In a yet further aspect, a first non-transitory computer-readable medium executable by a processor of a headend computer and a second non-transitory computer-readable medium executable by a processor of a seatback computer, wherein the first non-transitory computer-readable medium and the second non-transitory computer-readable medium include instructions in accordance with one or more of the methods disclosed herein.

DETAILED DESCRIPTION

Passengers traveling to their destinations on commercial airplanes are currently deprived of the experience the sensation and excitement of traveling in an airplane. For example, only a minority of passengers sitting on a window seat can experience an outside view by looking out through the aircraft windows. Even then, such a field of view is limited in span. A passenger sitting at a window seat sees the outside world from a limited viewing angle. In other words, a passenger sitting at a window seat cannot see the outside world barring what can be seen sitting through the window. The majority of passengers who do not have window seats and are sitting in the aisle or middle seats either have obstructed views or no views at all. Thus, there is a need to provide passengers with realistic, outside-world views along the flight path for a positive air travel experience. The disclosed technology is passenger-friendly because interactions with the displayed virtual environment realistic, outside-world views along the flight path is individual to each passenger. Thus, a passenger can tailor his/her virtual environment according to his/her preference.

The technology described in the present document can be used (in whole or in part) by embodiments of an in-flight entertainment systems: create opportunities for a more interactive and immersive travel experience for passengers and crew members, present never-seen-before views of the outside world of airplanes, improve scalability of various applications, create new revenue streams for airline companies, and improve innovation in the airplane industry. Advantageously, the embodiments disclosed in this document are applicable for any model or type of an airplane and not limited to certain types of aircraft.

Figure 1:
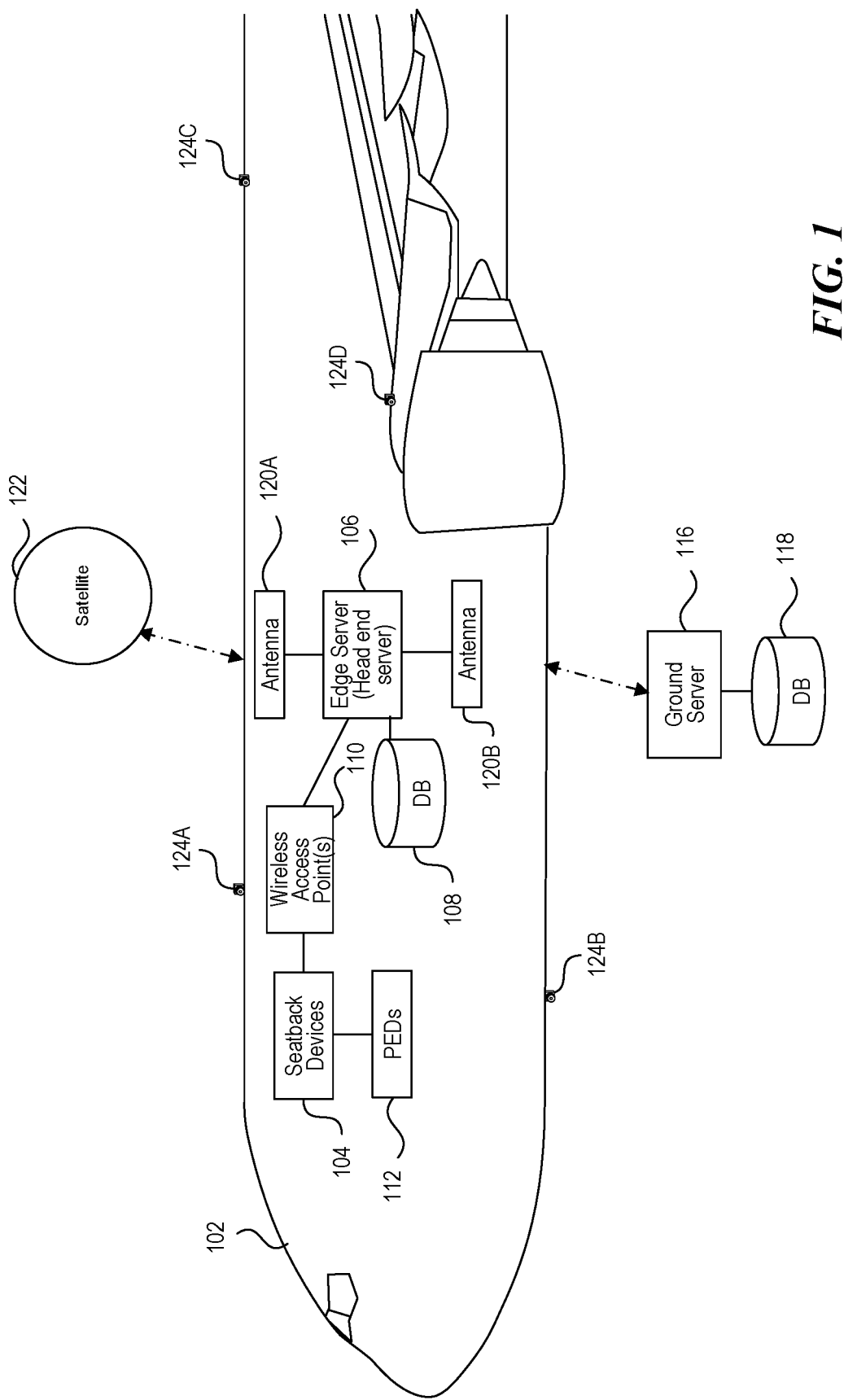
FIG. 1 shows an exemplary configuration of an arrangement of electronic devices associated with an airplane.

FIG. 1 shows an exemplary configuration of an arrangement of electronic devices associated with an airplane. The airplane 102 includes a collection of seatback devices 104 (e.g., one seatback device attached to each passenger's seat), an edge server 106, a database 108, one or more antenna 120A 120B, one or more wireless access points 110, and personal electronic devices 112 of passengers. The airplane is communicatively coupled to the outside world via satellite 122. One or more ground servers 116 and associated database(s) 118 communicate information to the airplane 102. For example, when the airplane 102 is waiting at an airport to board passengers or while the passengers are boarding the airplane 102, the ground server 116 can send the edge server 106 a list of various landmarks/points-of-interest on a flight path of the airplane 102. Based on capturing high-resolution image data from cameras 124A, 124B, 124C, 124D of the landmarks/points-of-interest on the flight path of the airplane 102, real-time, 3D, interactive, views of these landmarks/points-of-interest on the flight path of the airplane 102 can be displayed to passengers. Cameras 124A, 124B, 124C, 124D can capture images of landmarks/points-of-interest when the airplane 102 is within a visible range (e.g., when flying near or over) of such landmarks/points-of-interest. In some embodiments, the list of various landmarks/points-of-interest can be presented as possible viewing options to passengers. The list of various landmarks/points-of-interest can be stored in database 108 on the airplane 102. When airborne, the disclosed technology advantageously allows a passenger to track one or more landmarks/points-of-interest as the airplane is within visible range of a landmark/point-of-interest. For example, a passenger can choose to track multiple landmarks located at various geographical locations along the flight path of the airplane 102.

Edge server 106 (alternatively termed as head end server or compute server) can receive high resolution 3D images of the outside world from a plurality of cameras 124A, 124B, 124C, . . . externally attached to or mounted on the airplane 102. Upon receiving the images, the edge server 106 processes these images and delivers the processed content to seatback devices 104. For example, the processed content can be interactive, real-time, 3D virtual views of the outside world. In some embodiments, as shown in FIG. 1, the edge server 106 can communicate with seatback devices 104 wirelessly via access points 110. High-resolution images captured by the cameras 124A, 124B, 124C, . . . can be stored in the database 108. Database 108 can also store passenger manifests, flight path data, movies, television shows, musical content and other information/data.

Upon receiving interactive, real-time, 3D virtual views of the outside world, seatback devices 104 present such views to passengers via PEDs 112. For example, PEDs 112 can be VR headsets provided by the airline company to passengers for a better in-flight experience. There can be one VR headset for each seatback device 104. Each VR headset can be housed inside an enclosure of a seatback device 104. In some embodiments, a PED 112 can be a passenger's mobile phone, tablet computer, or a wearable electronic device. A PED 112 can be electronically coupled to a seatback device 104 via a wired or a wireless connection. In some embodiments, passengers can advantageously interact with the content presented on PEDs 112 using gestures, e.g., movements of the hand or head without having to select or touch a physical device. In some embodiments, passengers can interact with the content presented on PEDs 112 via a touch-screen interface. Although FIG. 1 shows a wireless connection between seatback devices 104 and the edge server 106, in some embodiments, the edge server 106 and seatback devices communicate via a high-speed avionics data bus wired throughout the airplane 102.

Figure 2A:
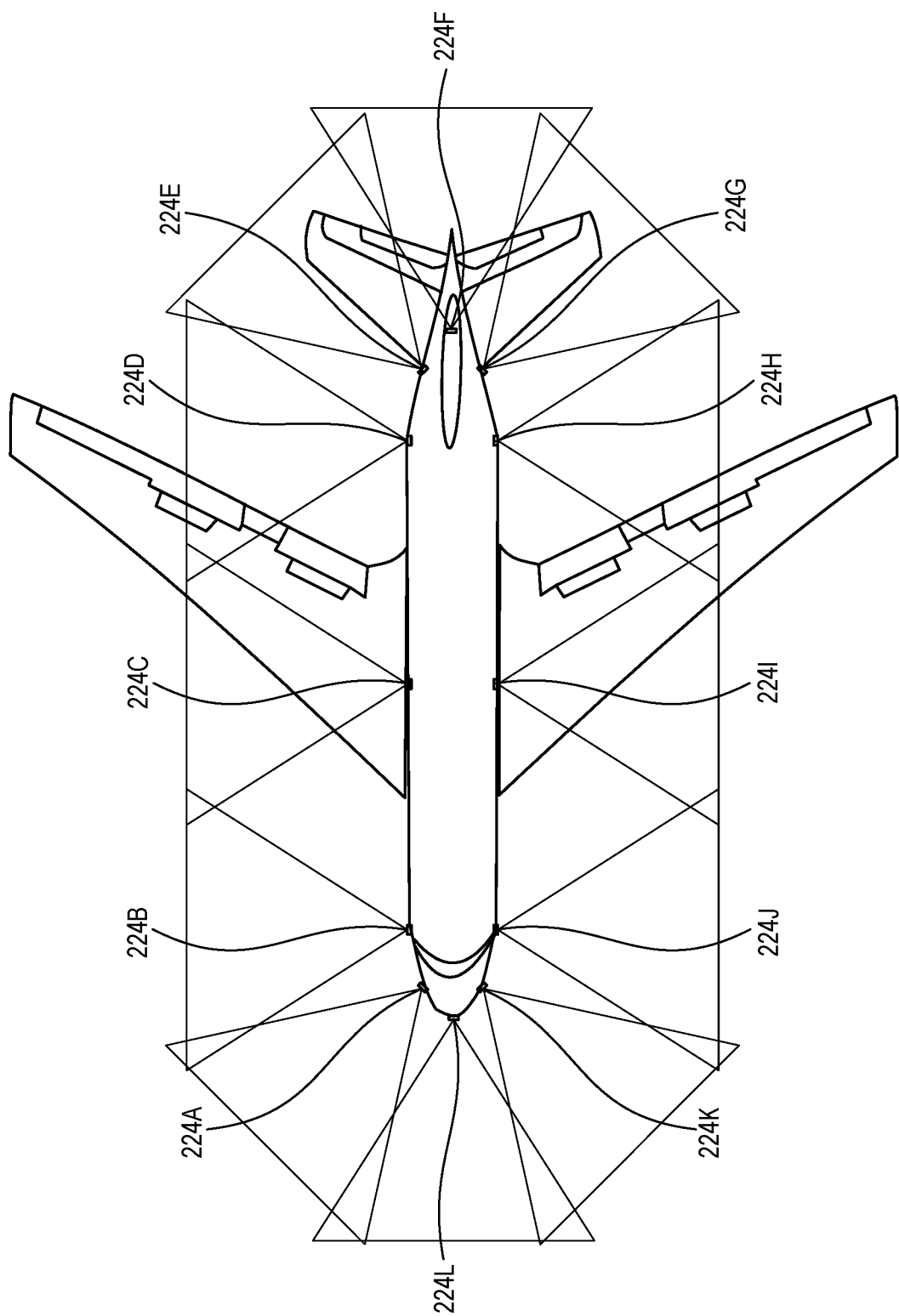
FIGS. 2A and 2B respectively show a top view and a front view of examples of camera array configurations externally attached to an airplane.
Figure 2C:
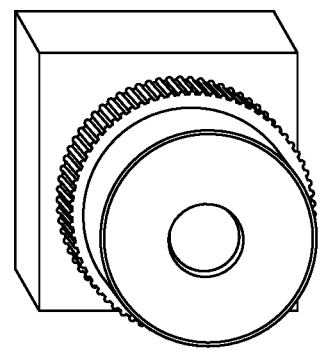
FIG. 2C shows an example of a high definition camera applicable for use on an airplane.
Figure 2B:
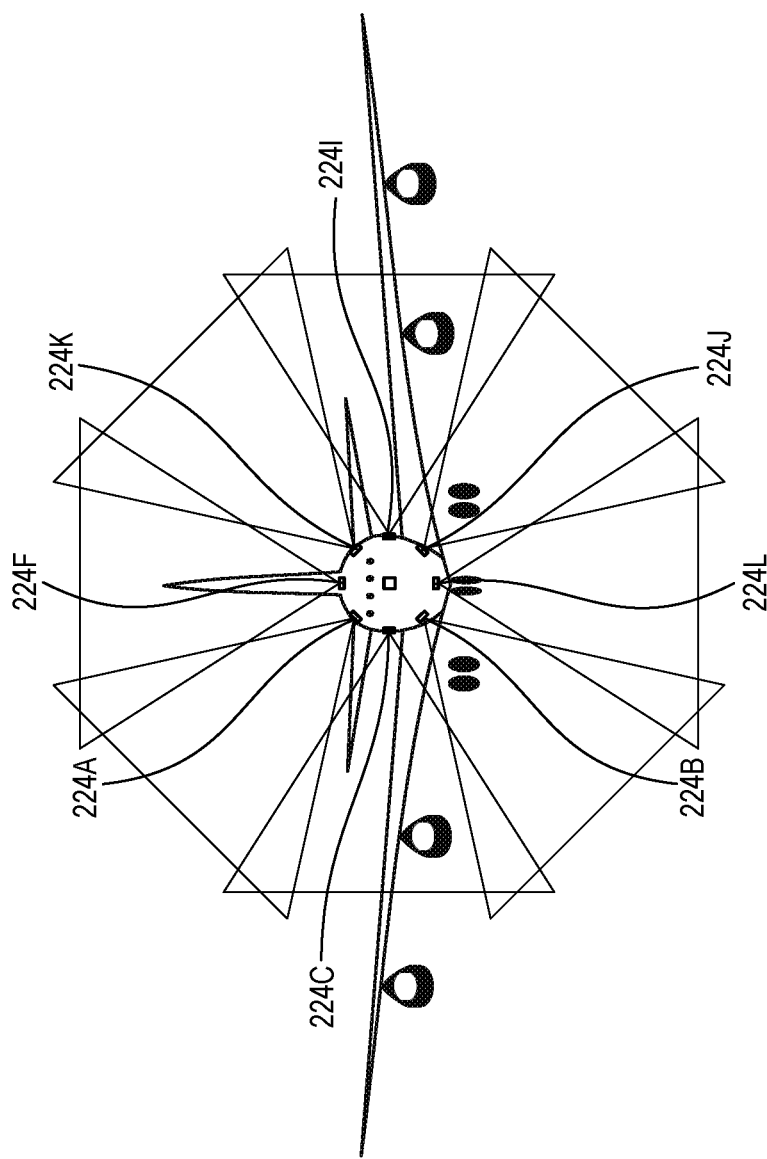

FIGS. 2A and 2B respectively show a top view and a front view of examples of camera array configurations externally attached to an airplane. A camera array comprises a plurality of high-resolution cameras 224A, 224B, 224C . . . 224K, 224L capturing images of the external world. The triangles in FIGS. 2A and 2B represent overlapping and non-overlapping fields of view captured by the cameras. In some embodiments, the camera array can be connected by a high-speed fiber network and/or an avionics bus to the edge server on the airplane. Cameras 224A, 224B, 224C . . . 224K, 224L can be attached on the belly, on the wing(s), on the tail, engine(s), fin(s), rudder, cockpit, fuselage, aileron(s), or any other location on the surface of an airplane. Furthermore, FIGS. 2A and 2B show that images captured by the cameras can have overlapping fields of view. Thus, it is possible for more than one camera to capture the same image or a same portion of an image. When placed externally on the airplane, cameras exposed to direct sunlight can be equipped with retractable solar filters to reduce glare and/or for protection. Although this document discusses examples of capturing images of the external world of an airplane when the airplane is airborne, in alternate embodiments, the disclosed technology can be suitably adapted for capturing images of the external world of an airplane when the airplane is on the ground.

FIG. 2C shows an example of a high definition camera applicable for use on an airplane. The camera can be a 4K or an 8K or higher resolution camera capturing 3D coordinates, e.g., height, width, and depth of objects in the outside world external to an airplane. The cameras can be individually controlled by the edge server. Operation of the camera, e.g., software updates to the firmware can be performed by the edge server on the airplane. Also, if a camera is malfunctioning or has failed, the edge server can determine the failure event and automatically notify the pilot and/or ground maintenance personnel. Advantageously, in some embodiments, the camera can allow zooming in and out can via a digital zoom, without requiring analog zooming lenses. Digital zooming can be achieved, for example, by using bi-cubic interpolation algorithms to achieve various zoom levels. The digital zooming algorithms can be implemented at the edge server and/or a seatback device.

Figure 3:
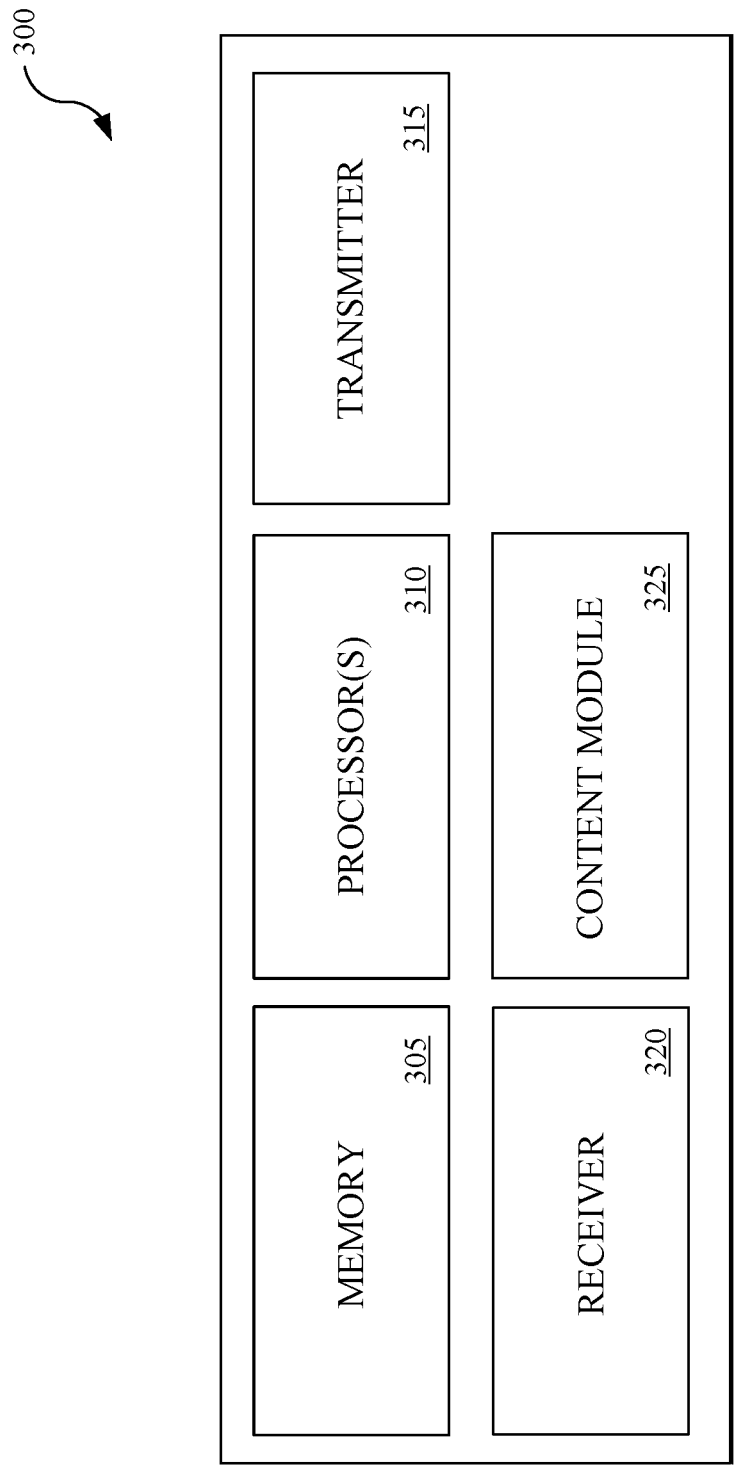
FIG. 3 shows an exemplary block diagram of an edge server in an airplane configured for creating interactive, real-time, 3D virtual views of the outside world.

FIG. 3 shows an exemplary block diagram of an edge server 300 in an airplane configured for creating interactive, real-time, 3D virtual views of the outside world. The edge server 300 includes at least one processor 310 and a memory 305 having instructions stored thereupon to perform the operations described in the various embodiments described in this patent document. For example, processor 310 can be an Intel® Xeon® processor capable of receiving, synchronizing, analyzing, and causing the rendering of realistic, 3D video in VR format. The transmitter 315 transmits or sends information or data to another device (e.g., ground server, seatback devices, cameras). The edge server 300 processes the data received from the cameras to generate a 3D image or view of the external world surrounding the airplane in real time or near real time. In some embodiments, the 3D image or view can be in VR format. The receiver 320 receives information or data transmitted or sent by another device (e.g., ground server, seatback devices, cameras). The content module 325 can store a list of various landmarks/points-of-interest on a flight path of the airplane.

In some embodiments, the edge server 300 performs partial processing of the image data captured by the cameras. For example, a portion of the processing of the image data is performed by the edge server 300 and the remainder of the processing of the image data is performed by the seatback devices. This functionality of distributed processing of image data allows "load balancing," thereby enabling efficient use of computational resources. The content module 325 can store the partially processed or intermediately-processed image data before sending to the seatback devices for further processing and presentation to passengers. Upon receiving the partially processed or intermediately-processed image data, a seatback computer performs additional processing of the intermediately-processed image data to generate a 3D virtual environment to be displayed on a VR headset device electronically coupled to the seatback computer.

In some embodiments, the content module 325 can add functionality to the processed 3D image data or the raw data captured by the cameras that would enable the 3D images to be interactive. For example, the content module 325 can add additional information about a landmark/point-of-interest, such as a date of creation, the history associated with the landmark/point-of-interest, or other statistics, facts, and figures that may be of interest to passengers. The additional information can be obtained in real time (e.g., via a satellite feed) from the Internet or it can be stored in a database associated with the edge server.

Figure 4:
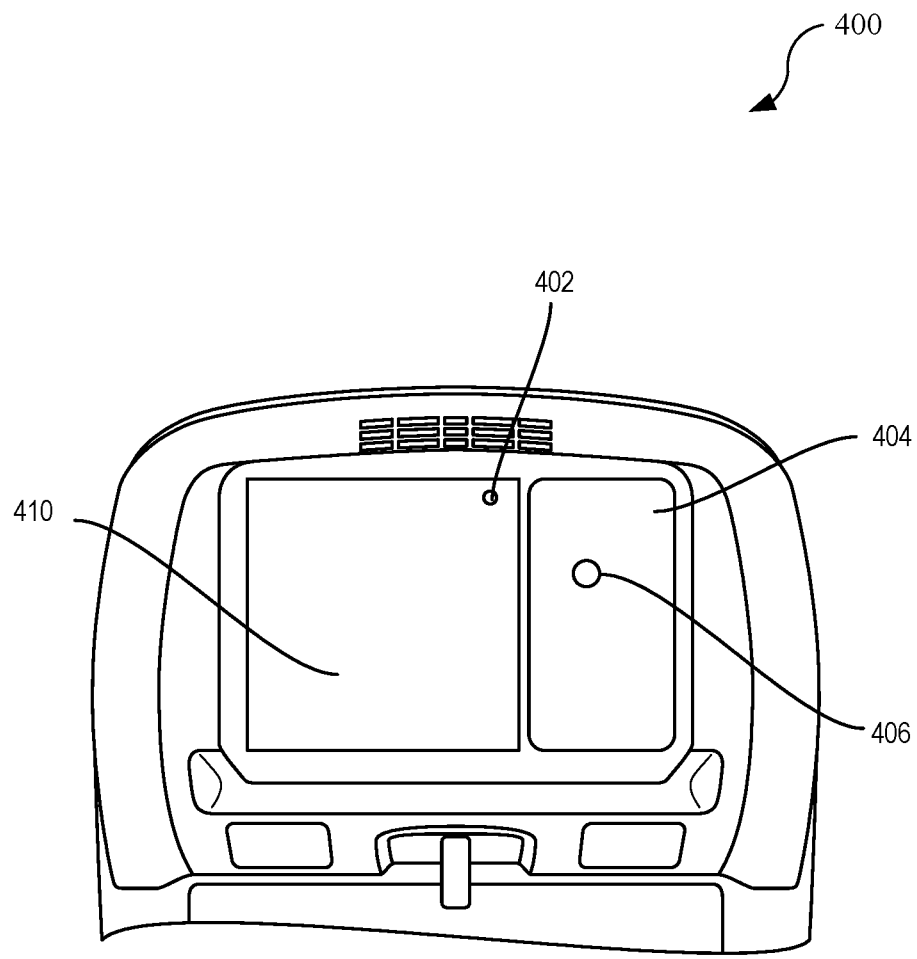
FIG. 4 shows an example of a seatback device.

FIG. 4 shows an example of a seatback device 400. The seatback device 400 functions as a base station for a personal electronic device such as a VR headset that can render realistic, 3D views of the outside world to a passenger seated behind the seatback 400. The seatback device 400 can include a base station CPU board 410 and can be powered by a power supply associated with the seatback device 400. The seatback device 400 can receive fully processed 3D image data or partly processed image data from the edge server for rendering on the VR headset. If partly processed data is received at the seatback device, then the base station CPU board 410 can perform further processing, as necessary.

Each seatback device 400 can be uniquely associated with a VR headset. The VR headset can be connected/paired to the seatback device 400 wirelessly or via a wired connection. When connected wirelessly, the VR headset and the seatback device 400 can use WiFi, NFC technology, or Bluetooth technology for communications. The VR headset can be stored in enclosure 404 (shown closed in FIG. 4) of the seatback device 400. For example, during takeoff and/or landing, the enclosure 404 can be automatically locked with the VR headset located inside, preventing use of the VR headset for aviation safety reasons. When the airplane is airborne at a sufficiently high flying altitude, a passenger can open the enclosure 404 by pressing an open/close button 406 on the enclosure 404 and take out the VR headset for use. When the seatback computer detects a presence of the VR headset inside the enclosure 404, the seatback computer can provide electrical power to charge the batteries of the VR headset. Accordingly, charging indicator 402 (e.g., a LED) can indicate a charging status (fully charged, partly charged, or fully discharged) of the VR headset. Further, in some embodiments, when the VR headset is docked inside the enclosure, the enclosure provides an environment to sanitize the VR headset, e.g., by ultraviolet light, an antibacterial spray and/or other method. Thus, the seatback computer can detect a presence of the VR headset inside the enclosure 404.

Figure 5:
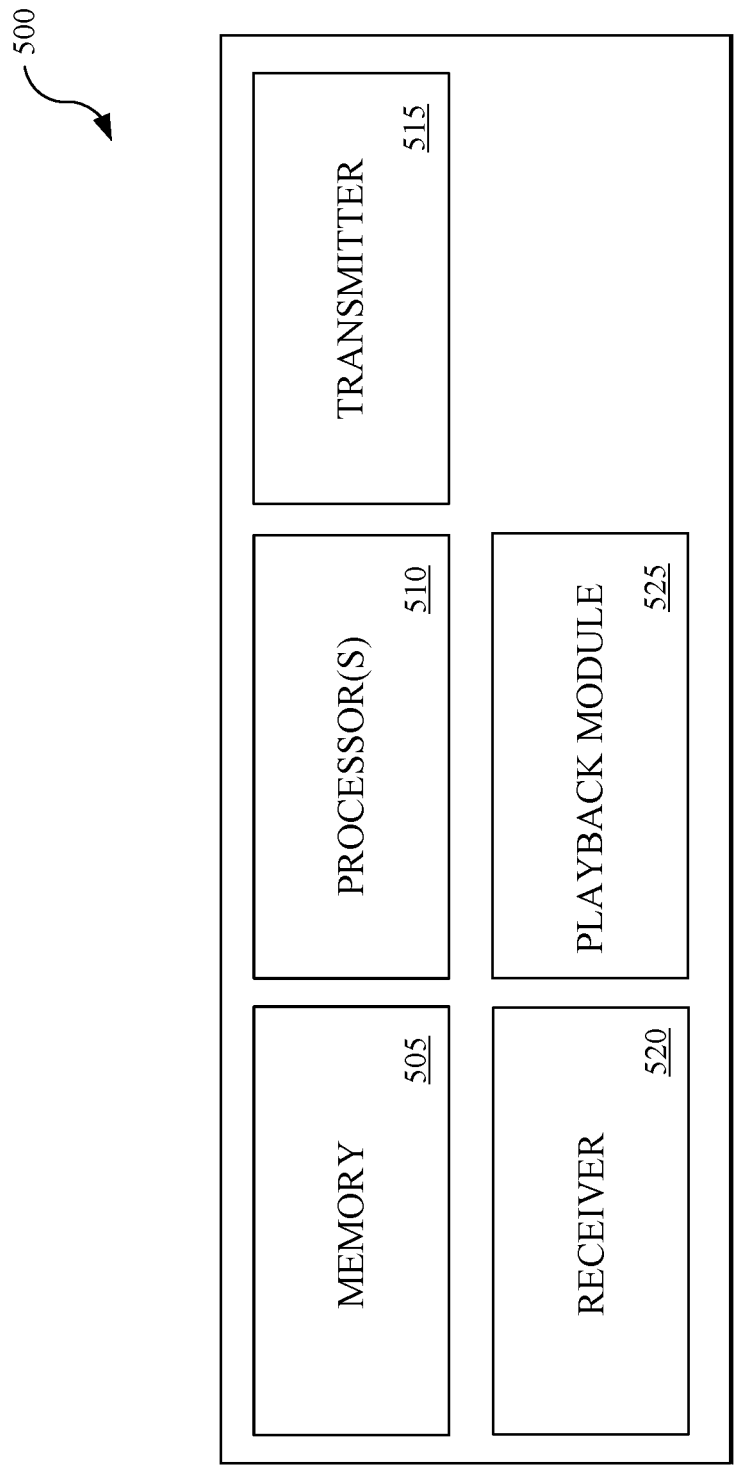
FIG. 5 shows an exemplary block diagram of a seatback device in an airplane.

FIG. 5 shows an exemplary block diagram of a seatback device 500. The seatback device includes one or more computers with at least one processor 510 and a memory 505 having instructions stored thereupon to perform the operations described in the various embodiments described in this patent document. For example, processor 510 can be an Intel® Xeon® processor capable of receiving (from a headend compute server) realistic, 3D video in VR format for rendering on a personal electronic device such as a VR headset. The transmitter 515 transmits or sends information or data to another device (e.g., headend compute server or a personal electronic device). The seatback device 500 processes the data received from the headend server to render a 3D image or view of the external world surrounding the airplane in real time or near real time for display on the personal electronic device. In some embodiments, the 3D image or view can be in VR format. The receiver 520 receives information or data transmitted or sent by another device (e.g., headend compute server or a personal electronic device). In some embodiments, a portion of the processing of the image data for composing a 3D image or a view is performed by the headend server and the remainder of the processing of the image data is performed by the seatback device 500. The playback module 525 of the seatback device 500 receives gesture-based interaction data from the personal electronic device, in response to a passenger interacting with the displayed 3D image or view. In accordance with the received gesture-based interaction data, the playback module 525 can dynamically change/modify the 3D virtual image or view displayed on the personal electronic device. Examples of gesture-based interaction data include selection of one or more user interface features associated with the displayed 3D image or view, panning, zooming in, zooming out, enabling tracking of any object viewable in the virtual environment or scaling.

Figure 6A:
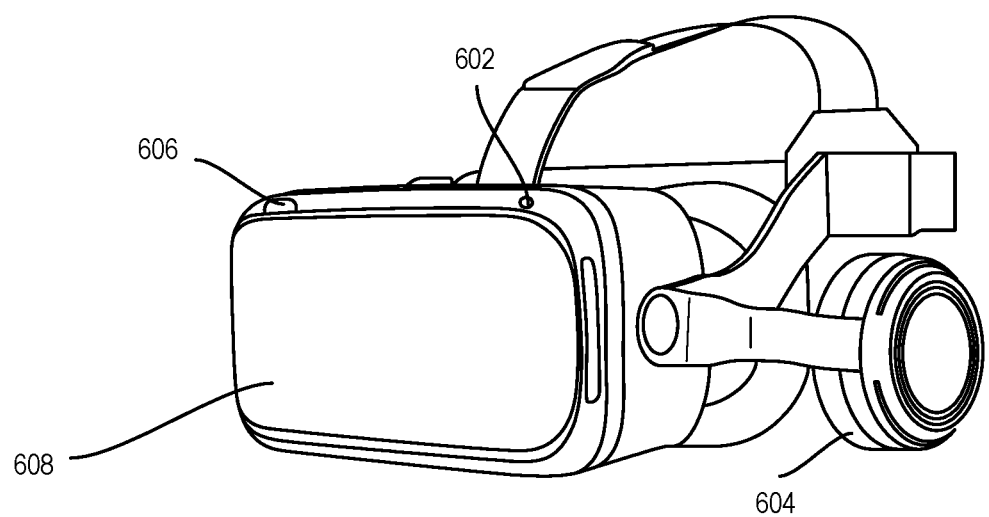
FIGS. 6A and 6B show different views of VR headsets.
Figure 6B:
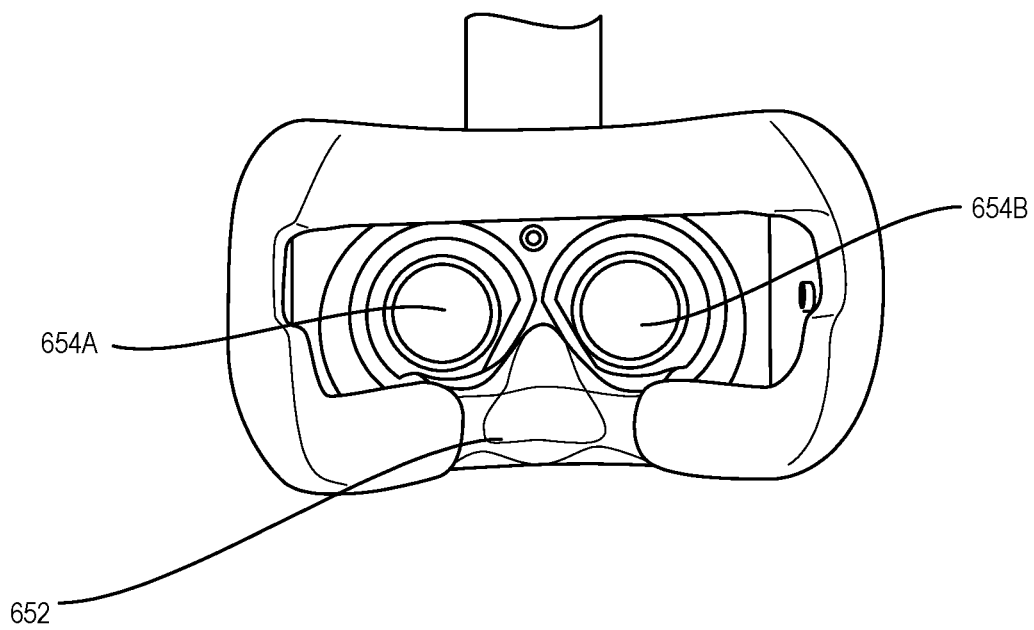

FIGS. 6A and 6B show different views of a VR headset that can render realistic 3D views of the outside world to a passenger and/or aircrew members. The VR headset includes noise canceling headphones 604, a high-definition viewing screen 608, an infrared camera 606, and an infrared LED emitter 602. In some embodiments, to assist handicapped individuals, a VR headset can include a microphone for voice-based commands to control the user interface displayed on the high-definition viewing screen 608. The high-definition viewing screen 608 can render interactive, 3D virtual view of the outside world from a commercial airplane. A highly-interactive user interface menu can be overlaid on the views. The user interface menu can display options for zooming in/out, looking at different views from different cameras, additional information about a landmark/point-of-interest within visible range.

In some embodiments, the VR headset can be operable to recognize/identify gestures of hands, face, or other body parts. For example, a hand gesture can bring up a cursor which would be overlaid on the high-definition viewing screen 608 of the VR headset. The passenger can position the cursor in the display with his/her right index finger and by doing a "double click" gesture, the gesture recognition feature of the VR headset can start to track what landmark/point-of-interest (or, a portion thereof) in space the cursor was pointing at, or to select items on the user interface menu. The cursor can then disappear and high-definition viewing screen 608 can continue tracking the landmark/point-of-interest until it disappears from the airplane's view or another hand gesture releases the tracking and restores the 3D virtual environment to a "normal" fly-by mode. Panning up/down, left, and right can be accomplished by finger gestures in the direction the passenger wishes to guide the displayed views and zooming in and out (and the degree of zoom) can be accomplished via measuring the distance between the index finger and thumb as the spread apart or come together. The zooming functionality can be provided by the VR headset and/or the associated seatback paired to the VR headset. Gesture-based navigation of the 3D environment interface displayed on the high-definition viewing screen 608 of the VR headset can be achieved by the infrared camera 606 (e.g., a gesture recognition sensor or an ambient light sensor) that can recognize gestures in the light from infrared LED emitter 602. An advantage of the disclosed technology is that even under low-light condition (e.g., at night when the cabin lights are dim or turned off), the disclosed technology would allow gesture-based navigation of the 3D environment interface displayed on the high-definition viewing screen 608 of the VR headset. An example of the gesture recognition technology that can be used in implementing embodiments of the disclosed technology is Google's gesture recognition technology. In some embodiments, upon detecting a low-light environment of operation, the VR headset can provide an indication of the low-light environment of operation to the seatback computer and/or the edge server.

FIG. 6B shows a view of the VR headset with a face cushion 652 for resting upper parts of the passenger's face when the passenger is wearing the VR headset. An example scenario illustrating operation of the disclosed technology is described. In an example scenario, a passenger wearing the VR headset moves his face to the left to track a landmark/point of interest appearing (in real time) on the left of the airplane's flight path. In some embodiments, the edge server continually analyzes image data received from the cameras and composes a 3D virtual environment. In some implementations, this 3D virtual environment is continually updated and/or refined based on information received from the cameras. When the passenger moves his head to the left, the VR headset detects the movements/gestures and informs the seatback computer of the passenger's gestures. Upon receiving passenger interaction data from the VR headset, the seatback computer dynamically updates the 3D virtual information in accordance with the interaction data. In some implementations, computational processing associated with updating the 3D environment is performed by the seatback computer. In some implementations, computational processing associated with updating the 3D environment is performed by the edge server. In some implementations, computational processing associated with updating the 3D environment is performed jointly by the seatback computer and the edge server.

In some embodiments, a VR headset can optionally perform eye tracking. Eye tracking regions 654A, 654B on the VR headset can allow for tracking a passenger's eyes.

In some embodiments, a handheld controller (integrated via software) can be optionally provided by an airline to be able to control the user interface displayed on the high-definition viewing screen 608.

Figure 7A:
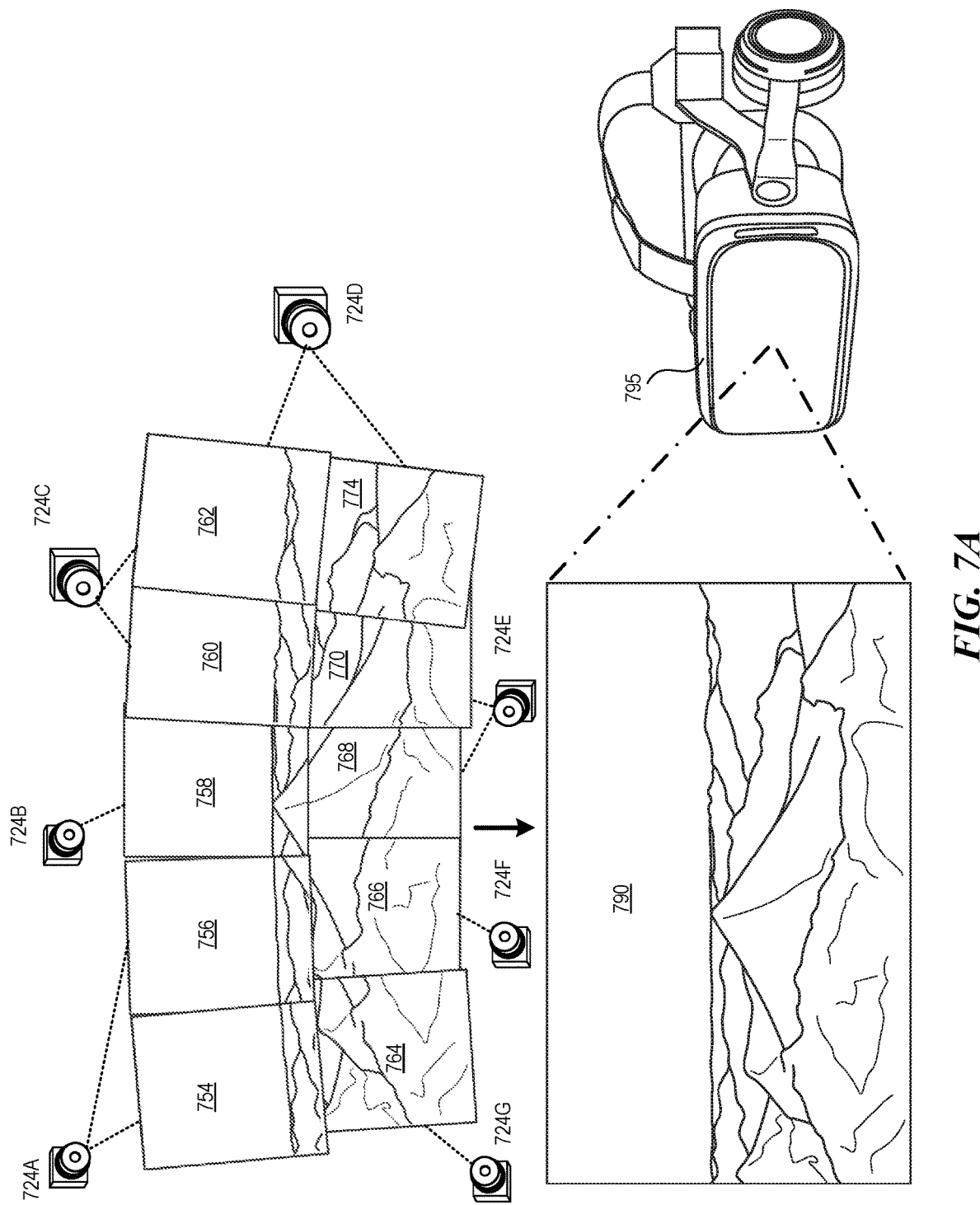
FIG. 7A shows an example interactive, 3D virtual view of the outside world from a commercial airplane presented by a VR headset.

FIG. 7A shows an example interactive, 3D virtual view of the outside world from a commercial airplane presented by a VR headset. Camera 724A captures high-resolution image data corresponding to images 754, 756. Camera 724B captures high-resolution image data corresponding to image 758. Camera 724C captures high-resolution image data corresponding to images 760, 762. Camera 724D captures high-resolution image data corresponding to images 762, 774. Thus, data corresponding to image 762 is captured by cameras 724C, 724D. In other words, the disclosed embodiments herein enable capturing high-resolution image data overlapping fields-of-view from multiple cameras.

FIG. 7A also shows resultant 3D virtual environment 790 composed from high-resolution image data 754-774 captured by cameras 724A-724G. The 3D virtual environment 790 is rendered on a high-definition screen of the VR headset 795. A passenger can interact with the 3D virtual environment 790 using hand gestures. In some embodiments, a seatback computer communicably coupled to the VR headset 795 can dynamically change or modify the 3D virtual environment 790 in response to receiving interaction data (e.g., corresponding to hand gestures or movements) from the VR headset 795.

Thus, advantageously, the disclosed technology can render a stunning, 360-degree view of the outside world in a 3D environment to a passenger on his/her VR headset. In some embodiments, if the passenger chooses to see a portion or a part of the 360-degree view of the outside world, the disclosed technology can provide such views to the passenger. The disclosed technology enables presentation of the views of the external world in the form of a wide panoramic image or hemispherical image. When a passenger is presented a hemispherical image on his/her VR headset, it appears to the passenger that he/she is at the center of a sphere. For example, a passenger can choose to look vertically above (e.g., at the sky), vertically down (e.g., at a waterbody or clouds in the atmosphere), to the left, to the right, or at any number of point(s) spanning a 3-dimensional plane. In order to render the 3D real-time VR image(s), the edge server and/or the seatback device can control the cameras so the cameras are focused at infinity. As a result, a consistent digital capture environment can be maintained and errors/distortions during the image composition process can be avoided.

Figure 7B:
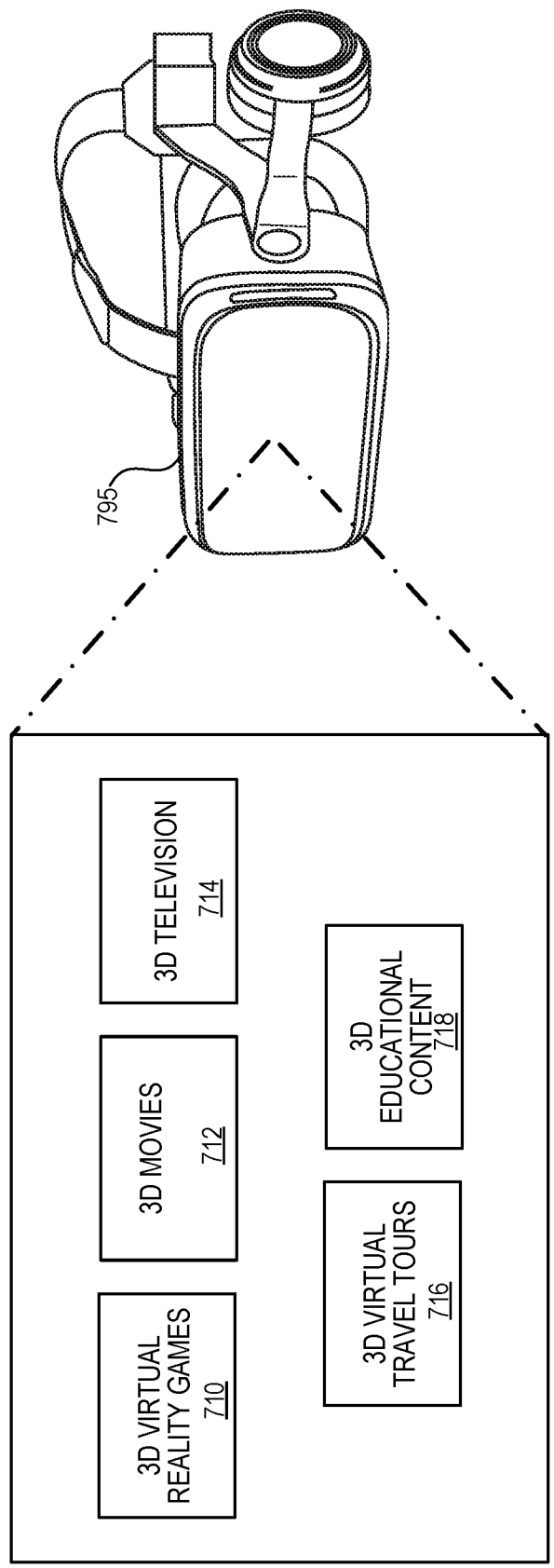
FIG. 7B shows an example interactive graphical user interface (GUI) presented by a VR headset.

FIG. 7B shows an example interactive graphical user interface (GUI) presented by a VR headset 795. For example, FIG. 7B shows the GUI displaying options for 3D games 710, 3D movies 712, 3D television 714, 3D virtual travel tours 716, and 3D educational content 718. The options in FIG. 7B are merely for illustrating the advantage of the disclosed technology in being able to render various types of content in addition to 3D virtual view of an environment surrounding the airplane. There can be other types of options and interface features in alternate embodiments.

Further, the content available as entertainment can be in 3D format or regular (non-3D) format. Furthermore, some content can be offered for free to passengers, whereas some content (e.g., premium content) can be offered to passengers for renting or buying. A passenger can use gestures to interact with the user interface to select the various content options.

Figure 8:
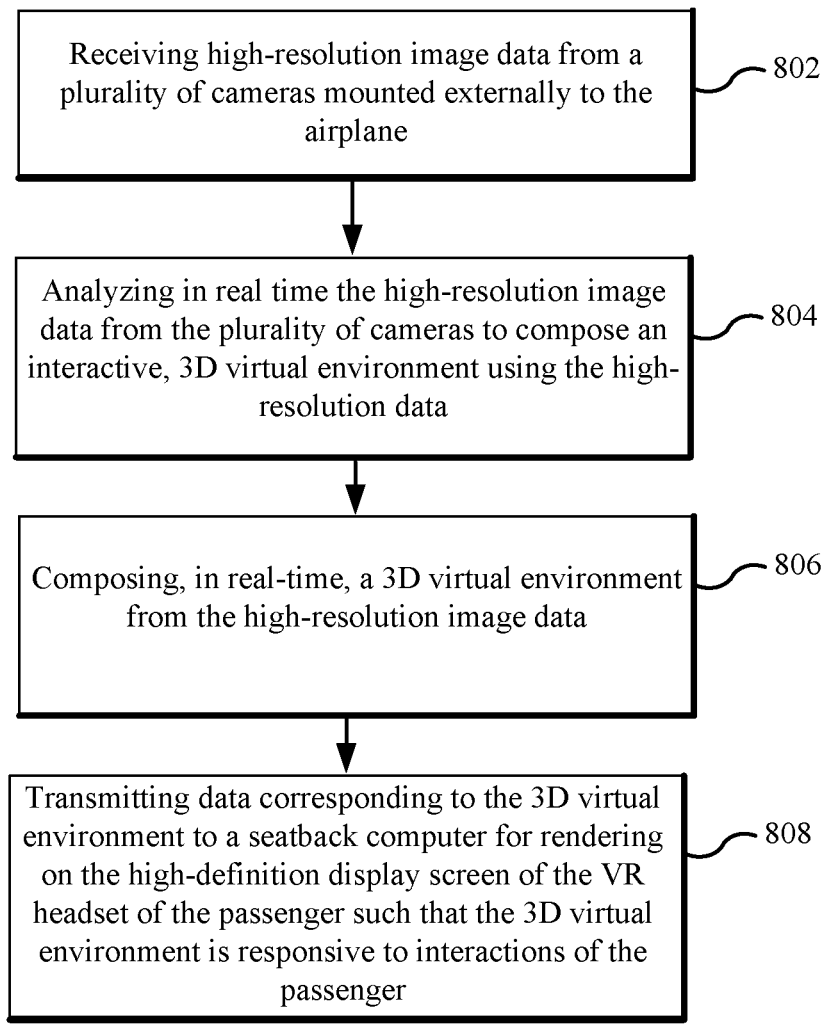
FIG. 8 shows an example method for creation of an interactive, 3D virtual view by an edge server.

FIG. 8 shows an example method for creation of interactive, 3D virtual view/environment of the outside world from an airplane. Steps of this method are discussed from the perspective of an edge server. At step 802, the edge server receives high-resolution image data from a plurality of cameras mounted externally to the airplane. At step 804, the edge server analyzes (in real time) the high-resolution image data from the plurality of cameras to compose an interactive, 3D virtual environment using the high-resolution image data. At step 806, the edge server composes in real-time, a 3D virtual environment from the high-resolution image data. At step 808, the edge computer transmits data corresponding to the 3D virtual environment to a seatback computer for rendering on a high-definition display screen of a virtual reality (VR) headset of a passenger such that the 3D virtual environment is responsive to interactions of the passenger, wherein the VR headset device is electronically coupled to the seatback computer.

Figure 9:
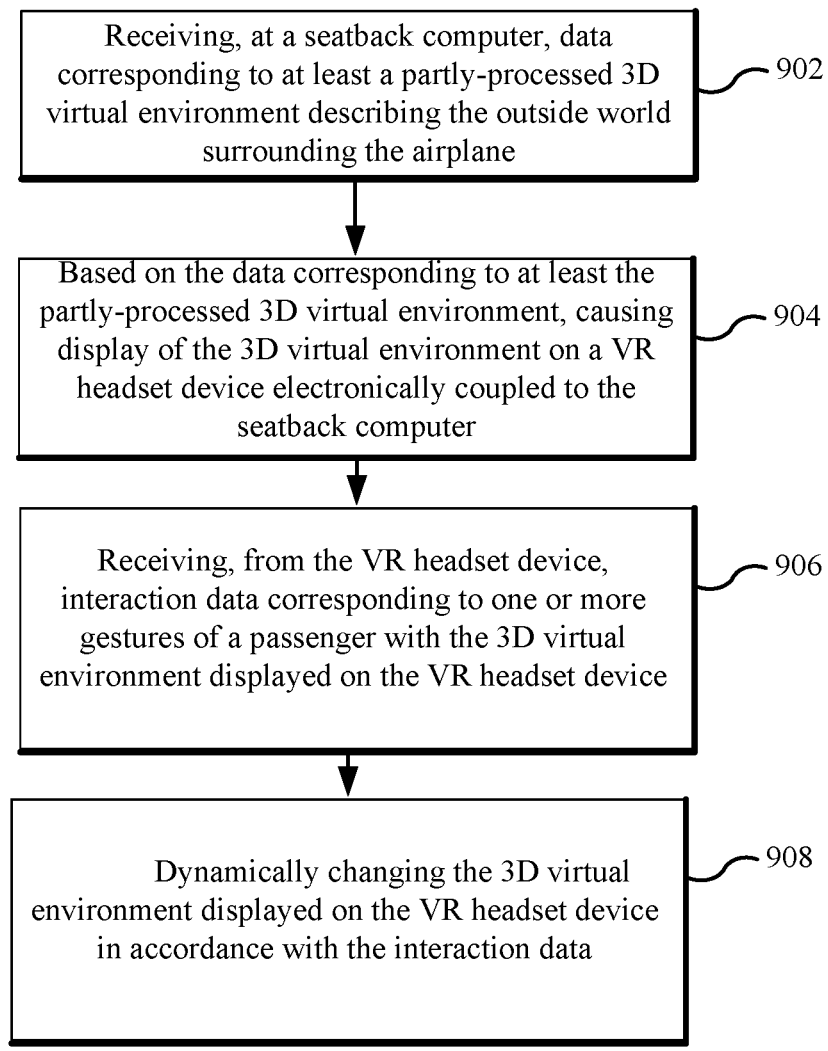
FIG. 9 shows an example method for processing of an interactive, 3D virtual view by a seatback device.

FIG. 9 shows an example method for processing of interactive, 3D virtual view/environment of the outside world from an airplane. Steps of this method are discussed from the perspective of a seatback device. At step 902, the seatback computer receives data corresponding to at least a partly-processed 3D virtual environment describing the outside world surrounding the airplane. At step 904, based on the data corresponding to at least the partly-processed 3D virtual environment, the seatback computer causes display of the 3D virtual environment on a VR headset device electronically coupled to the seatback computer. At step 906, the seatback computer receives (from the VR headset device) interaction data corresponding to one or more gestures of a passenger with the 3D virtual environment displayed on the VR headset device. At step 908, the seatback computer dynamically changes/modifies the 3D virtual environment displayed on the VR headset device in accordance with the interaction data.

Figure 10:
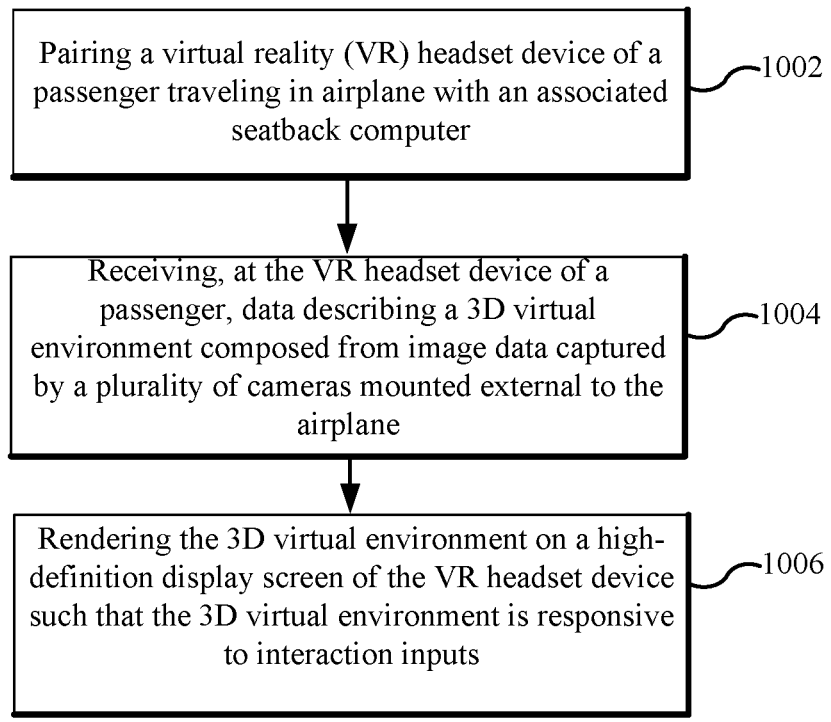
FIG. 10 shows an example method for rendering of an interactive, 3D virtual view by a VR headset.

FIG. 10 shows an example method for rendering of an interactive, 3D virtual view by a VR headset. At step 1002, the VR headset itself with an associated seatback computer housed in a seat of an airplane. At step 1004, the VR headset receives data (e.g., from the edge server) describing a 3D virtual environment composed from image data captured by a plurality of cameras mounted external to the airplane. At step 1006, the VR headset renders (e.g., on a high-definition display screen of the VR headset) the 3D virtual environment device such that the 3D virtual environment is responsive to interaction inputs.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method of rendering a customizable 3D virtual environment of an outside world surrounding an airplane comprising:
   pairing a virtual reality (VR) headset device of a passenger with an associated seatback computer;
   receiving, at the VR headset device, data describing a 3D virtual environment composed from image data captured by a plurality of cameras mounted external to the airplane, wherein a seatback computer associated with the VR headset device includes an enclosure, and wherein the seatback computer associated with the VR headset device includes a charging indicator that indicates a charging status of the VR headset device;
   rendering the 3D virtual environment on a high-definition display screen of the VR headset device such that the 3D virtual environment is responsive to interaction inputs; and
   providing, at the seatback computer, electrical charge to the VR headset device when docked inside the enclosure.

2. The method of claim 1, wherein the pairing uses a wired connection.

3. The method of claim 1, wherein the rendering includes tracking of an object included in the 3D virtual environment.

4. The method of claim 1, further comprising:
   detecting, at the VR headset device, one or more hand gestures of the passenger used in interacting with the 3D virtual environment displayed on the high-definition display screen of the VR headset device; and
   recognizing, by the VR headset, the one or more hand gestures of the passenger.

5. The method of claim 4, wherein the recognizing includes a use of an LED light and an ambient light sensor included on the VR headset devices.

6. The method of claim 5, wherein the recognizing is during operation of the VR headset device in a low-light environment.

7. A method of rendering a customizable 3D virtual environment of an outside world surrounding an airplane comprising:
   receiving, at a seatback computer, data corresponding to at least a partly-processed 3D virtual environment describing the outside world surrounding the airplane, wherein a seat associated with the seatback computer includes an enclosure, and wherein the seat associated with the seatback computer includes a charging indicator that indicates a charging status of the VR headset device;
   based on the data corresponding to at least the partly-processed 3D virtual environment, causing display of the 3D virtual environment on a VR headset device electronically coupled to the seatback computer;
   receiving, from the VR headset device, interaction data corresponding to one or more gestures of a passenger with the 3D virtual environment displayed on the VR headset device;

dynamically changing the 3D virtual environment displayed on the VR headset device in accordance with the interaction data; and
providing, by the seatback computer, electrical charge to the VR headset device when docked inside the enclosure.

8. The method of claim 7, wherein the receiving the interaction data includes receiving a request for interaction with at least a portion of an object in the 3D virtual environment displayed on a display screen of the VR headset device.

9. The method of claim 7, wherein the dynamically changing the 3D virtual environment is in response to at least one of: a selection of one or more user interface features associated with the 3D virtual environment, a panning operation, a zooming in operation, a zooming out operation, or a scaling operation.

10. The method of claim 7, further comprising:
detecting, by the seatback computer a presence of the VR headset device inside the enclosure.

11. The method of claim 7, further comprising:
pairing with the VR headset device via a wireless connection.

12. A system for rendering a customizable 3D virtual environment of an outside world surrounding an airplane comprising:
a headend computer having at least one processor configured to perform:
receive image data from a plurality of cameras mounted external to the airplane;
analyze in real time the image data from the plurality of cameras to compose an interactive, 3D virtual environment using the image data; and
compose, in real-time, a 3D virtual environment from the image data;
transmit data corresponding to the 3D virtual environment to a seatback computer for rendering on a high-definition display screen of a virtual reality (VR) headset of a passenger such that the 3D virtual environment is responsive to interactions of the passenger; and
the seatback computer having at least one processor configured to perform:
receive the data corresponding to the 3D virtual environment describing the outside world surrounding the airplane, wherein a seat associated with the seatback computer includes an enclosure, and wherein the seat associated with the seatback computer includes a charging indicator that indicates a charging status of the VR headset device;
based on the data corresponding to the 3D virtual environment, cause display of the 3D virtual environment on a VR headset device electronically coupled to the seatback computer;
receive, from the VR headset device, interaction data corresponding to one or more gestures of a passenger with the 3D virtual environment displayed on the VR headset device;
dynamically change the 3D virtual environment displayed on the VR headset device in accordance with the interaction data; and
provide, by the seatback computer, electrical charge to the VR headset device when docked inside the enclosure.

13. The system of claim 12, wherein the 3D virtual environment describing the outside world surrounding the airplane is composed of image data with overlapping fields-of-view captured by more than one of the plurality of cameras.

14. The system of claim 12, wherein the 3D virtual environment describing the outside world surrounding the airplane is customizable to viewing preferences of individual passengers.

15. The system of claim 12, wherein the VR headset device includes an LED light and an ambient light sensor configured for operation in low-light environment.

16. The system of claim 15, wherein the ambient light sensor is configured to recognize one or more hand gestures of the passenger used in interacting with the 3D virtual environment displayed on a high-definition display screen of the VR headset device.

17. The system of claim 12, wherein, when the VR headset is docked inside the enclosure, the enclosure provides an environment to sanitize the VR headset.

18. The system of claim 12, wherein the VR headset enables tracking of an object included in the 3D virtual environment.

* * * * *